(12) United States Patent
Kudoh (10) Patent No.: US 10,924,855 B2
(45) Date of Patent: Feb. 16, 2021

(54) MICROPHONE FOR AMBISONICS, A/B FORMAT CONVERSION SOFTWARE, RECORDER, AND PLAYBACK SOFTWARE

(71) Applicant: ZOOM CORPORATION, Tokyo (JP)

(72) Inventor: Shunsuke Kudoh, Tokyo (JP)

(73) Assignee: ZOOM CORPORATION, Tokyo (JP)

(*) Notice: Subject to any disclaimer, the term of this patent is extended or adjusted under 35 U.S.C. 154(b) by 0 days.

(21) Appl. No.: 16/548,229

(22) Filed: Aug. 22, 2019

(65) Prior Publication Data
US 2020/0112790 A1 Apr. 9, 2020

(30) Foreign Application Priority Data
Oct. 4, 2018 (JP) .................. 2018-188932

(51) Int. Cl.
| H04R 5/027 | (2006.01) |
| G06F 3/01 | (2006.01) |
| G06F 3/16 | (2006.01) |
| H04R 29/00 | (2006.01) |
| H04S 7/00 | (2006.01) |
| H04R 1/08 | (2006.01) |

(52) U.S. Cl.
CPC ............ *H04R 5/027* (2013.01); *G06F 3/012* (2013.01); *G06F 3/165* (2013.01); *H04R 1/083* (2013.01); *H04R 29/004* (2013.01); *H04S 7/30* (2013.01); *H04S 2400/15* (2013.01); *H04S 2420/11* (2013.01)

(58) Field of Classification Search
USPC .... 381/26, 56, 61, 91, 92, 95, 111, 122, 175
See application file for complete search history.

(56) References Cited

U.S. PATENT DOCUMENTS

| 2014/0286493 A1 | 9/2014 | Kordon et al. |
| 2014/0307894 A1 | 10/2014 | Kordon et al. |
| 2018/0035235 A1* | 2/2018 | Funakoshi ............... G06T 7/70 |
| 2019/0289285 A1* | 9/2019 | Nashida .............. H04N 9/3147 |

FOREIGN PATENT DOCUMENTS

| JP | 2014535231 A | 12/2014 |
| JP | 2014535232 A | 12/2014 |

* cited by examiner

*Primary Examiner* — Yosef K Laekemariam
(74) *Attorney, Agent, or Firm* — The Webb Law Firm (57) ABSTRACT

A microphone to generate A format signals used for ambisonics includes: a body of the microphone, first through fourth microphone elements provided facing sound pickup directions different from each other in the body and configured to output respective first signals to be components of the A format signals; and a six-axis sensor configured to detect displacement of the body and output information on a position of the body.

10 Claims, 9 Drawing Sheets

W=FLU+FRD+BLD+BRU
X=FLU+FRD−BLD−BRU
Y=FLU−FRD+BLD−BRU
Z=FLU−FRD−BLD+BRU

Fig. 5A
Upright

Fig. 5B
Endfire

Fig. 5C
Upside Down

MICROPHONE FOR AMBISONICS, A/B FORMAT CONVERSION SOFTWARE, RECORDER, AND PLAYBACK SOFTWARE

CROSS-REFERENCE TO RELATED APPLICATION

This application claims priority to Japanese Patent Application No. 2018-188932 filed Oct. 4, 2018, the disclosure of which is hereby incorporated by reference in its entirety.

TECHNICAL FIELD

The present invention relates to a microphone for ambisonics, A/B format conversion software, a recorder, and playback software.

BACKGROUND ART

Ambisonics is a technique to record the entire sound throughout peripheral 360° in a space and reproduce the same. Such ambisonics is capable of providing spatial audio containing sound in forward and backward directions, left and right directions, and upward and downward directions. With the proliferation of virtual reality (VR) technique in recent years, ambisonics is used for audio for 360° video.

Figure 1A:
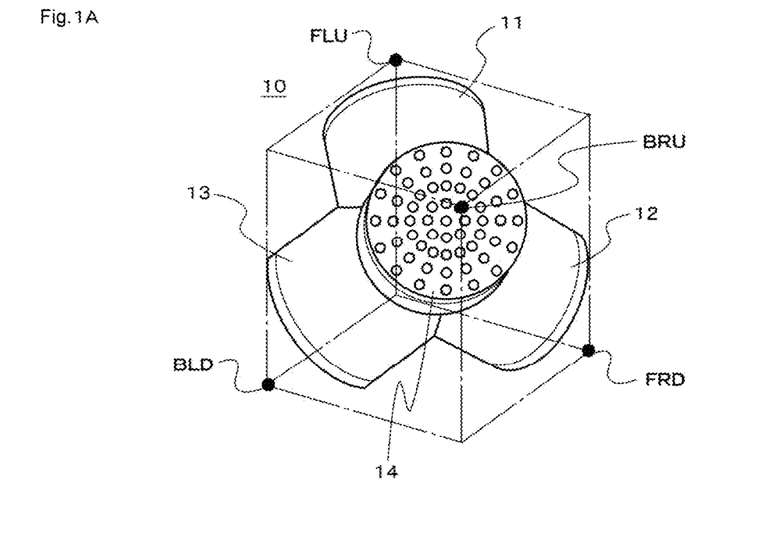
FIG. 1A is a perspective view illustrating a microphone used for ambisonics.
Figure 1B:
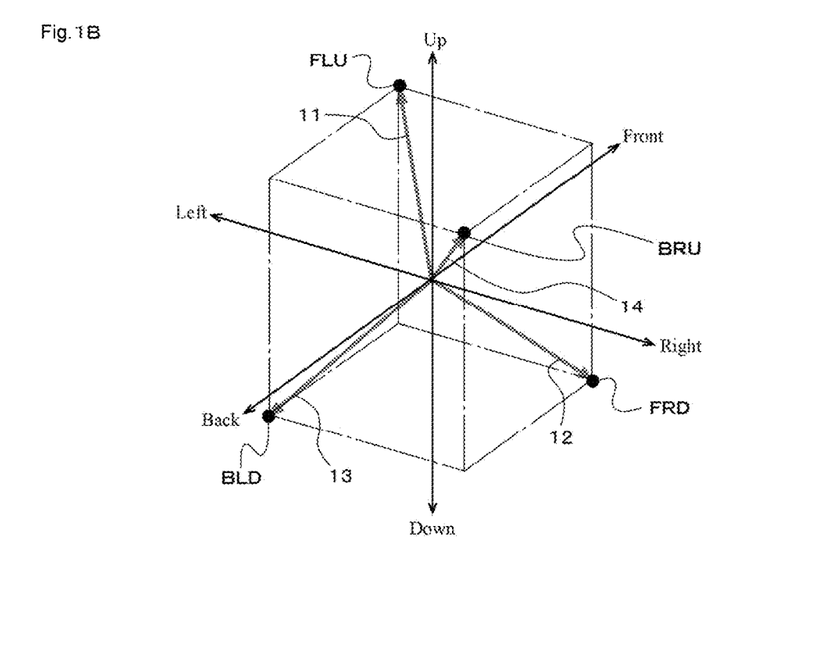
FIG. 1B is a schematic diagram illustrating the orientation of first through fourth microphone elements configuring the microphone.

With reference to FIGS. 1A to 3B, the principles of ambisonics are described. FIG. 1A illustrates a microphone 10 used for ambisonics. The microphone 10 is provided with first through fourth microphone elements 11 to 14. The first through fourth microphone elements 11 to 14 are provided facing four vertices of a cube illustrated by a dash dotted line. FIG. 1B illustrates orientation of the first through fourth microphone elements 11 to 14. The first microphone element 11 is directed to Front Left Up (FLU) of the microphone 10. The second microphone element 12 is directed to Front Right Down (FRD) of the microphone 10. The third microphone element 13 is directed to Back Left Down (BLD) of the microphone 10. The fourth microphone element 14 is directed to Back Right Up (BRU) of the microphone 10.

Figure 2:
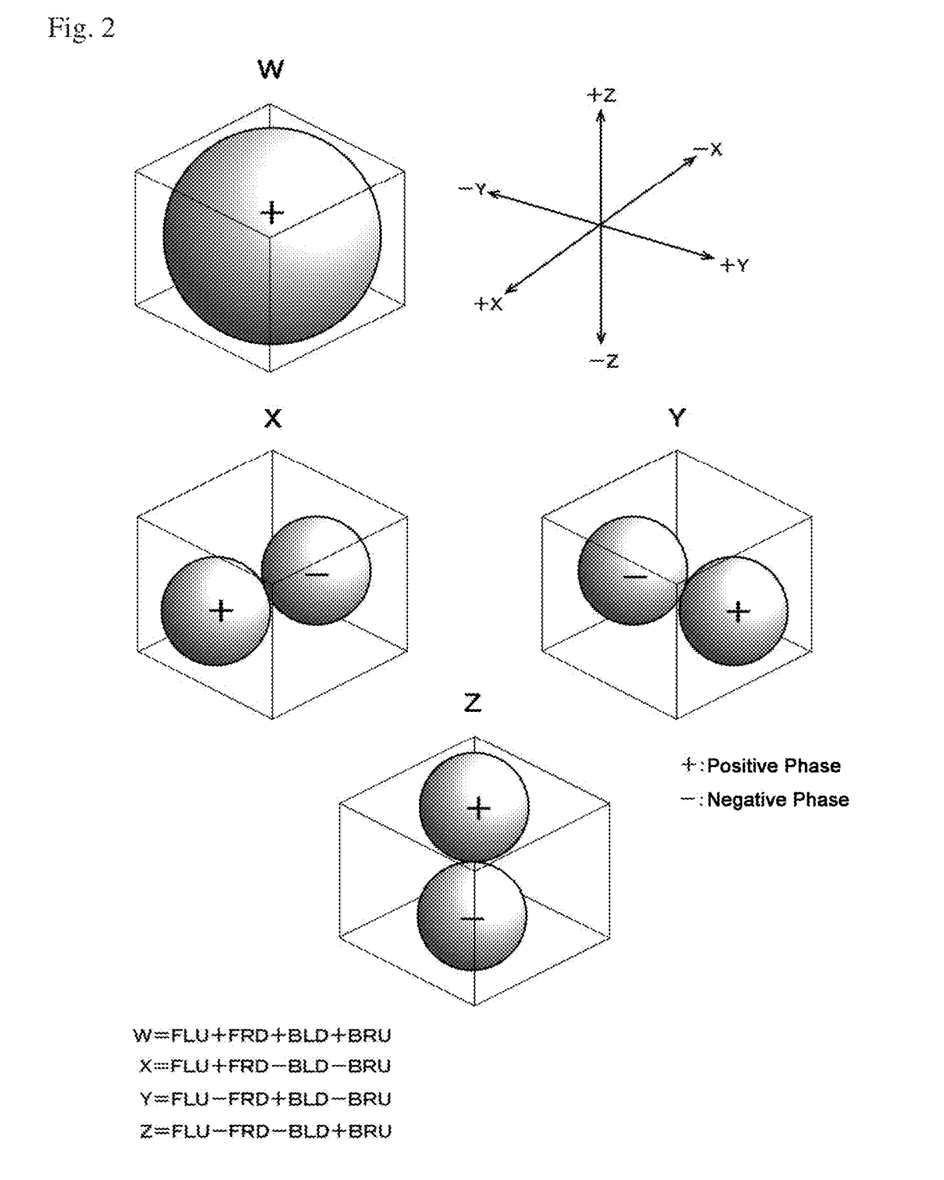
FIG. 2 is a schematic diagram illustrating directivities of B format signals W, X, Y, and Z.

The first through fourth microphone elements 11 to 14 pick up sound in the four directions of FLU, FRD, BLD, and BRU. Signals of the sound in the four directions of FLU, FRD, BLD, and BRU are called as "A format signals". Such the A format signals are not directly usable and are converted to "B format signals" with a directivity as illustrated in FIG. 2. Such B format signals consists of a signal W of sound in all directions, a signal X of sound in forward and backward directions, a signal Y of sound in left and right directions, and a signal Z of sound in upward and downward directions.

The A format signals are converted to B format signals W, X, Y, and Z by formulae (1) through (4) below.

$$W = FLU + FRD + BLD + BRU \quad (1)$$

$$X = FLU + FRD - BLD - BRU \quad (2)$$

$$Y = FLU - FRD + BLD - BRU \quad (3)$$

$$Z = FLU - FRD - BLD + BRU \quad (4)$$

In the above formulae, W denotes a signal of sound in all directions, X denotes a signal of sound in forward and backward directions, Y denotes a signal of sound in left and right directions, Z denotes a signal of sound in upward and downward directions, FLU denotes a signal of Front Left Up sound, FRD denotes a signal of Front Right Down sound, BLD denotes a signal of Back Left Down sound, and BRU denotes a signal of Back Right Up sound.

Figure 3A:
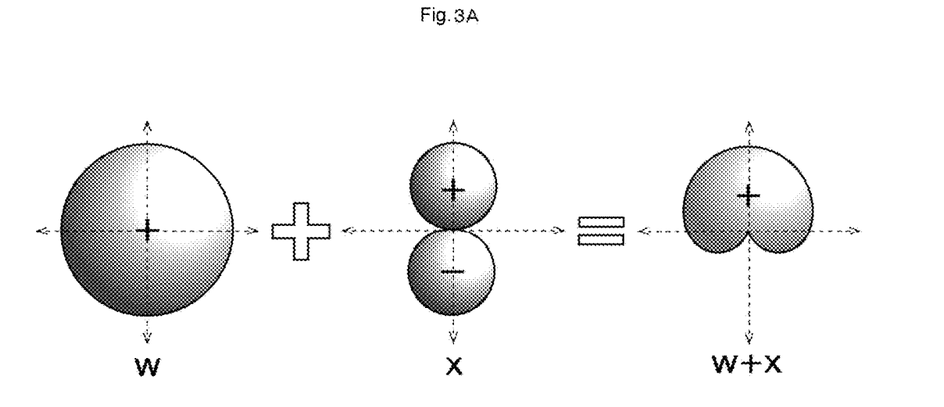
FIG. 3A is a schematic diagram illustrating the directivity in synthesis of the B format signals W and X.
Figure 3B:
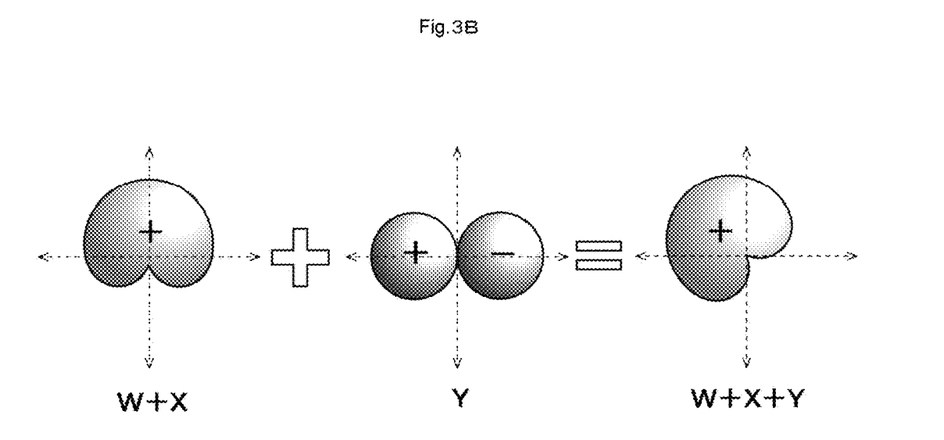
FIG. 3B is a schematic diagram illustrating the directivity in synthesis of the B format signals W, X, and Y.

Synthesis of the B format signals W, X, Y, and Z produces a signal of omnidirectional sound including the forward and backward, left and right, and upward and downward directions. For example, FIG. 3A illustrates a directivity in synthesis of W and X. FIG. 3B illustrates a directivity in synthesis of W, X, and Y. As illustrated in FIG. 3B, synthesis of W, X, and Y at a signal level identical to each other generates a signal of sound with a directivity of "45° left forward". Synthesis of the B format signals W, X, Y, and Z by differentiating the signal levels from each other allows generation of a signal of sound with any directivity among the omnidirectionality including the forward and backward, left and right, and upward and downward directions. Accordingly, based on the data of recorded B format signals W, X, Y, and Z, it is possible to freely change the localization of the played-back sound. Use of such ambisonics for audio for 360° video allows change in the localization of the played-back sound in accordance with the orientation of the head of a user.

PRIOR ART DOCUMENTS

Patent Documents

Patent Document 1: JP 2014-535232 A
Patent Document 2: JP 2014-535231 A

DISCLOSURE OF THE INVENTION

The microphone 10 illustrated in FIG. 1A has a body, not shown, provided with the first through fourth microphone elements 11 to 14 where the orientation of the body is defined. For example, the microphone 10 has the body with defined "Front" and "Up" and indications showing the "Front" and the "Up" are printed on the body. The indications showing the "Front" and the "Up" of the body coincide with the actual forward and upward directions, and thus the orientation of the first through fourth microphone elements 11 to 14 coincides with FLU, FRD, BLD, and BRU illustrated in FIG. 1B.

Figure 4:
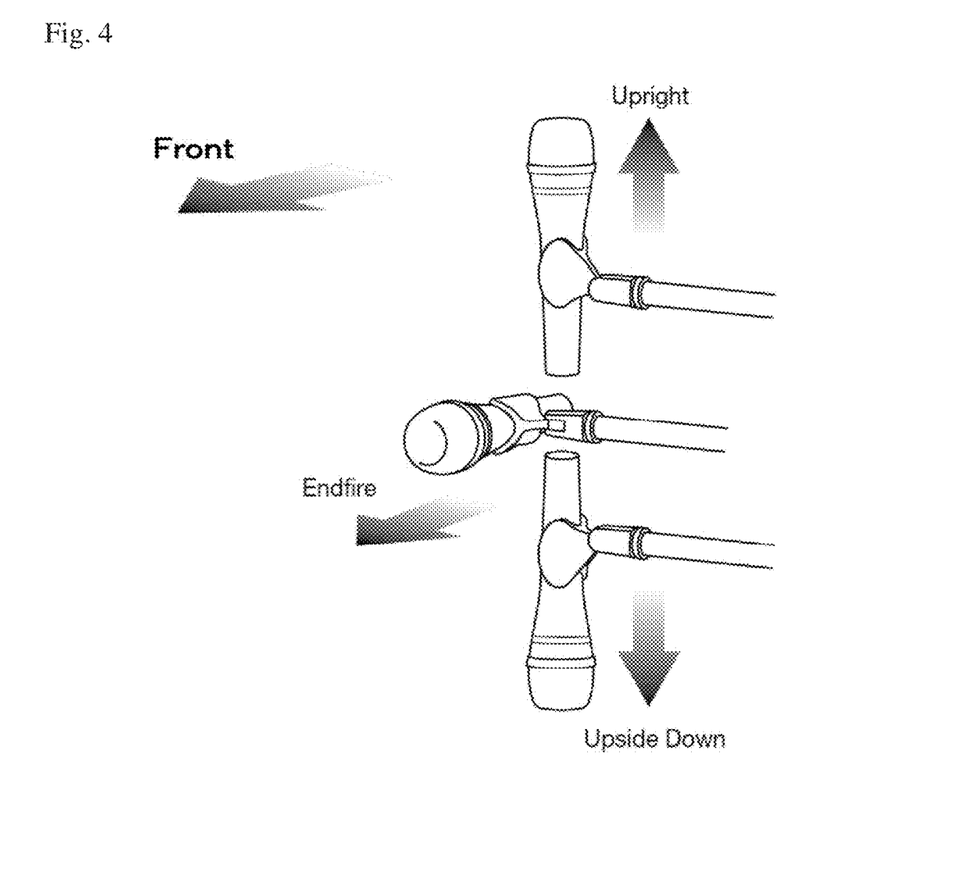
FIG. 4 is a simplified diagram illustrating "Upright", "Endfire", and "Upside Down" states as general placement of a microphone.

FIG. 4 illustrates general placement of a microphone. As illustrated in FIG. 4, the microphone 10 is placed in any orientation among "Upright", "Endfire", and "Upside Down" during recording.

Figure 5A:
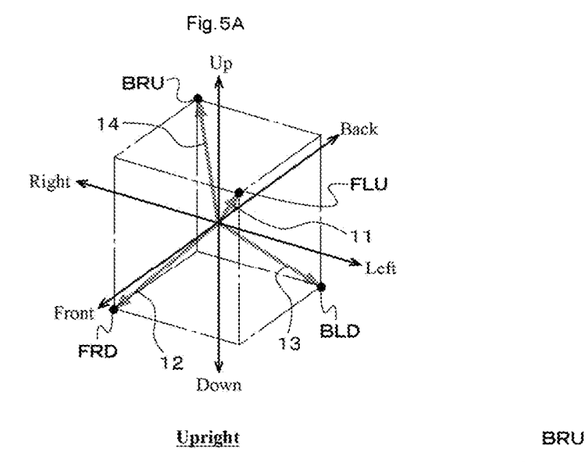
FIG. 5A is a schematic diagram illustrating the orientation of the first through fourth microphone elements when the microphone in FIG. 1A is placed in the orientation of "Upright".

As illustrated in FIG. 5A, when the microphone 10 is placed in the orientation of "Upright", the "Front" and the "Up" of the body coincide with the actual front and up. As a result, the orientation of the first through fourth microphone elements 11 to 14 coincides with FLU, FRD, BLD, and BRU. That is, the first microphone element 11 is directed to Front Left Up (FLU), the second microphone element 12 is directed to Front Right Down (FRD), the third microphone element 13 is directed to Back Left Down (BLD), and the fourth microphone element 14 is directed to Back Right Up (BRU). Accordingly, four signals (A format signals) picked up by the first through fourth microphone elements 11 to 14 are correctly associated respectively with FLU, FRD, BRU, and BLD in the above formulae (1) through (4) and converted to B format signals W, X, Y, and Z in a correct positional relationship.

However, when the microphone 10 is placed in orientation other than "Upright", for example, in the orientation of "Endfire" or "Upside Down", the "Front" and the "Up" of the body do not coincide with the actual forward and upward directions. As a result, as illustrated in FIGS. 5B and 5C, the orientation of the first through fourth microphone elements 11 to 14 does not coincide with FLU, FRD, BLD, and BRU.

Figure 5B:
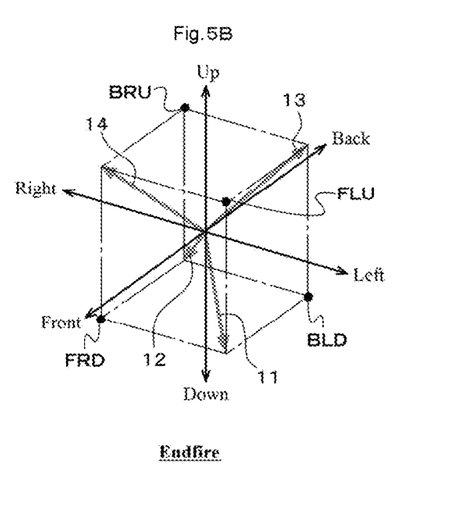
FIG. 5B is a schematic diagram illustrating the orientation of the first through fourth microphone elements when the microphone in FIG. 1A is placed in the orientation of "Endfire".
Figure 5C:
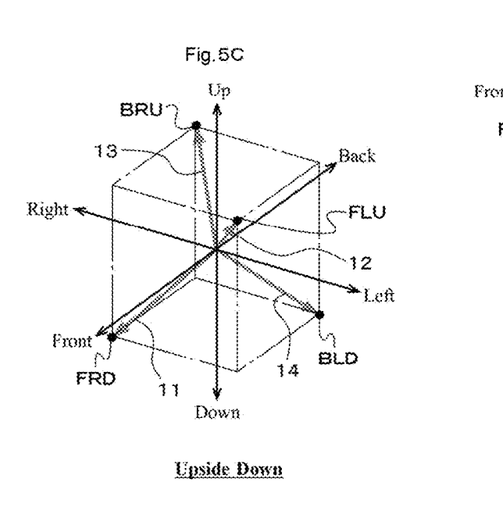
FIG. 5C is a schematic diagram illustrating the orientation of the first through fourth microphone elements when the microphone in FIG. 1A is placed in the orientation of "Upside Down".

As illustrated in FIG. 5B, when the microphone 10 is placed in the orientation of "Endfire", the first through fourth microphone elements 11 to 14 are not directed to FLU, FRD, BLD, and BRU. That is, the first microphone element 11 is directed to Front Left Down (FLD), the second microphone element 12 is directed to Back Right Down (BRD), the third microphone element 13 is directed to Back Left Up (BLU), and the fourth microphone element 14 is directed to Front Right Up (FRU). When the microphone 10 is placed in the orientation of "Endfire", the above formulae (1) through (4) thus have to be replaced by formulae (5) through (8) below for conversion of the A format signals (FLD, BRD, BLU, and FRU) to the B format signals W, X, Y, and Z.

$$W=FLD+BRD+BLU+FRU \tag{5}$$

$$X=FLD-BRD-BLU+FRU \tag{6}$$

$$Y=FLD-BRD+BLU-FRU \tag{7}$$

$$Z=-FLD-BRD+BLU+FRU \tag{8}$$

In the above formulae, W denotes a signal of sound in all directions, X denotes a signal of sound in forward and backward directions, Y denotes a signal of sound in left and right directions, Z denotes a signal of sound in upward and downward directions, FLD denotes a signal of lower left front sound, BRD denotes a signal of lower right back sound, BLU denotes a signal of upper left back sound, and FRU denotes a signal of upper right front sound.

As illustrated in FIG. 5C, when the microphone 10 is placed in the orientation of "Upside Down", the orientation of the first through fourth microphone elements 11 to 14 does not coincide with FLU, FRD, BLD, and BRU. That is, the first microphone element 11 is directed to Front Right Down (FRD), the second microphone element 12 is directed to Front Left Up (FLU), the third microphone element 13 is directed to Back Right Up (BRU), and the fourth microphone element 14 is directed to Back Left Down (BLD). When the orientation (FRD, FLU, BRU, and BLD) of the first through fourth microphone elements 11 to 14 is not correctly associated with FLU, FRD, BLD, and BRU in the above formulae (1) through (4), the A format signals picked up by the first through fourth microphone elements 11 to 14 cannot be converted to the B format signals W, X, Y, and Z in a correct positional relationship.

Moreover, the microphone 10 may be placed at an inclination of a predetermined angle. In this case as well, the orientation of the first through fourth microphone elements 11 to 14 does not coincide with FLU, FRD, BLD, and BRU.

As just described, for conversion of the A format signals picked up by the first through fourth microphone elements 11 to 14 to the B format signals W, X, Y, and Z in a correct positional relationship, arithmetic processing has to be performed considering the placement of the microphone 10 during recording. A user thus has to record the placement of the microphone 10 during recording. Further, a user has to input information on the placement of the microphone 10 to a computer for conversion of the recorded A format signals to the B format signals W, X, Y, and Z by A/B format conversion software.

The present invention has been made in view of the above problems and it is an object thereof to provide a microphone, A/B format conversion software, a recorder, and playback software that are capable of converting four-channel A format signals picked up by the first through fourth microphone elements to B format signals W, X, Y, and Z in a correct positional relationship no matter in which orientation the microphone is placed.

(A) To achieve the above problems, a microphone of the present invention to generate A format signals used for ambisonics includes: a body of the microphone; first through fourth microphone elements provided facing sound pickup directions different from each other in the body and configured to output respective first signals to be components of the A format signals, and one or more sensors configured to detect displacement of the body and to output information on a position of the body.

(B) It is preferred that, in the microphone of (A) above, the sensor is an accelerometer that is capable of detecting the displacement of the body in forward and backward directions, left and right directions, and upward and downward directions and configured to output angular information in a horizontal direction and a vertical direction of the body.

(C) It is preferred that, in the microphone of (B) above, the sensor further includes a gyro sensor capable of detecting rotation of the body and is configured to output angular information in a rotation direction.

(D) To achieve the above problems, A/B format conversion software of the present invention to convert the A format signals generated by the microphone of (A) above to B format signals, the A/B format conversion software causes a processor to execute the processing including: distinguishing respective sound pickup directions of the first through fourth microphone elements based on the information on the position of the body outputted from the sensor; selecting mathematical expressions to convert the A format signals to the B format signals based on the respective sound pickup directions of the first through fourth microphone elements; and converting the first signals outputted from the respective first through fourth microphone elements, by addition and subtraction based on the mathematical expressions, to a plurality of second signals to be components of the B format signals.

(E) To achieve the above problems, a recorder of the present invention to record data of A format signals and/or B format signals used for ambisonics, the recorder includes: the microphone of (A) above; the A/B format conversion software of (D) above; the processor to execute the processing of the A/B format conversion software; and a memory to record the data of the A format signals and/or the B format signals, wherein the information on the position of the body outputted from the sensor is recorded in the memory as metadata for the data of the A format signals and/or the B format signals.

(F) It is preferred that, in the recorder of (E) above, type information of A format or B format is recorded in the memory as metadata for the data of the A format signals or the B format signals.

(G) It is preferred that, in the recorder of (E) above, the recorder further includes an image display, wherein the processor causes the image display to display an image indicating a degree of horizontality and/or a degree of verticality of the body based on the information on the position of the body outputted from the sensor.

(H) It is preferred that, in the recorder of (E) above, the recorder further includes B format/stereo conversion software to convert the B format signals to stereo signals, wherein the B format/stereo conversion software causes the processor to execute the processing including: differentiating signal levels of two or more of the second signals to be the components of the B format signals from each other based on the information on the position of the body outputted from the sensor, and converting the two or more of the second signals having the differentiated signal levels, by synthesizing them, to two third signals to be components of the stereo signals.

(I) To achieve the above problems, playback software of the present invention to play back the data of the B format signals, by a mobile device, recorded by the recorder of (E) above, the playback software includes B format/stereo conversion software to convert the B format signals to stereo signals, wherein the B format/stereo conversion software causes a processor of the mobile device to execute the processing including: differentiating signal levels of two or more of the second signals to be the components of the B format signals from each other based on information on a position of a body of the mobile device outputted from a sensor of the mobile device, and converting the two or more of the second signals having the differentiated signal levels, by synthesizing them, to two third signals to be components of the stereo signals.

(J) Playback software to play back the data of the A format signals, by a mobile device, recorded by the recorder of (E) above, the playback software includes: the A/B format conversion software to convert the A format signals to the B format signals and B format/stereo conversion software to convert the B format signals to stereo signals, wherein the A/B format conversion software causing a processor of the mobile device to execute the processing including distinguishing respective sound pickup directions of the first through fourth microphone elements based on the information on the position recorded in the memory as the metadata, and the B format/stereo conversion software causing the processor of the mobile device to execute the processing including differentiating signal levels of two or more of the second signals to be the components of the B format signals from each other based on information on a position of a body of the mobile device outputted from a sensor of the mobile device and converting the two or more of the second signals having the differentiated signal levels, by synthesizing them, to two third signals to be components of the stereo signals.

The microphone, the A/B format conversion software, the recorder, and the playback software of the present invention are capable of converting the A format signals picked up by the first through fourth microphone elements to the B format signals in a correct positional relationship no matter in which orientation the microphone is placed.

BRIEF DESCRIPTION OF THE DRAWINGS

FIGS. 6A through 6D are diagrams illustrating a recorder according to an embodiment of the present invention.

DETAILED DESCRIPTION OF THE INVENTION

A description is given below to an embodiment of the recorder including the microphone, the A/B format conversion software, and the playback software of the present invention with reference to the drawings.

<External Structure>

Figure 6A:
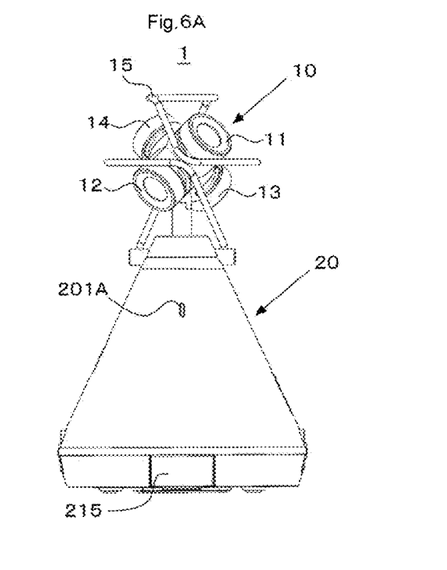
FIG. 6A is a front view.
Figure 6B:
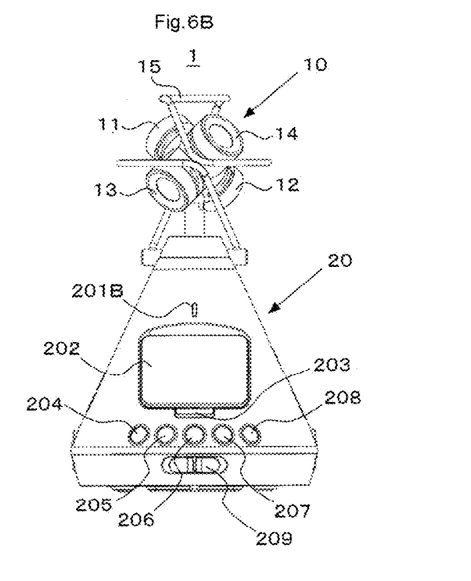
FIG. 6B is a rear view.
Figure 6C:
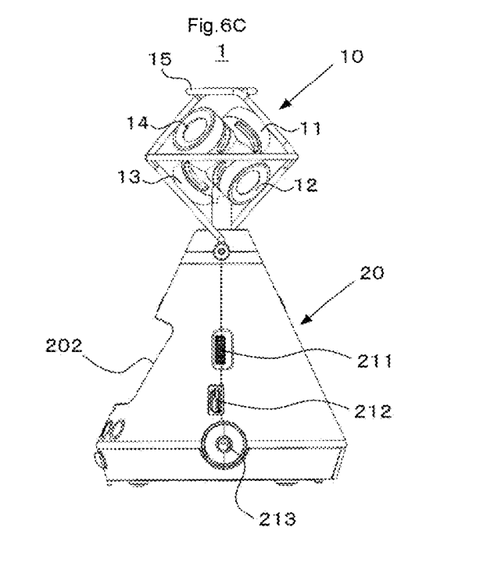
FIG. 6C is a left side view.
Figure 6D:
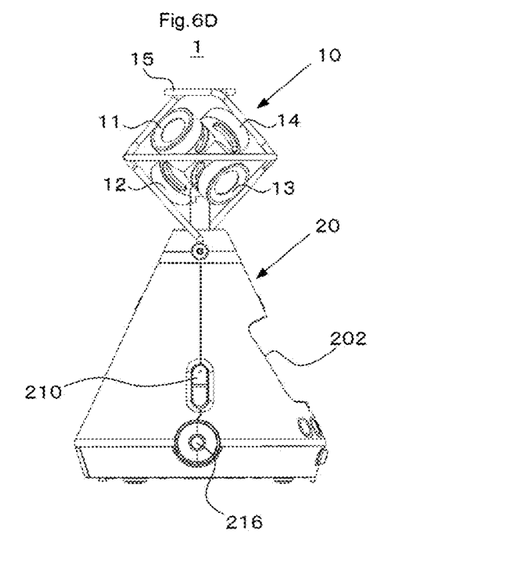
FIG. 6D is a right side view.
Figure 7A:
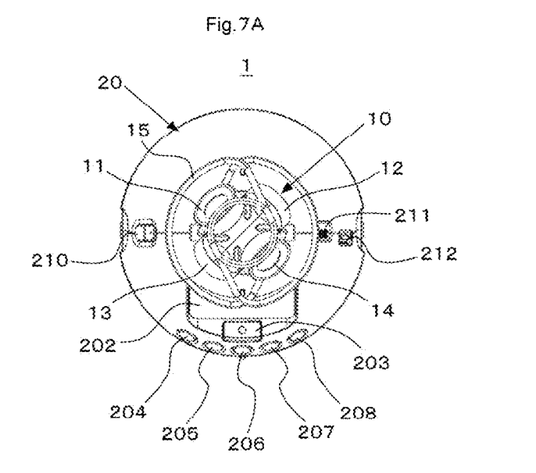
FIG. 7A is a top view of the recorder.
Figure 7B:
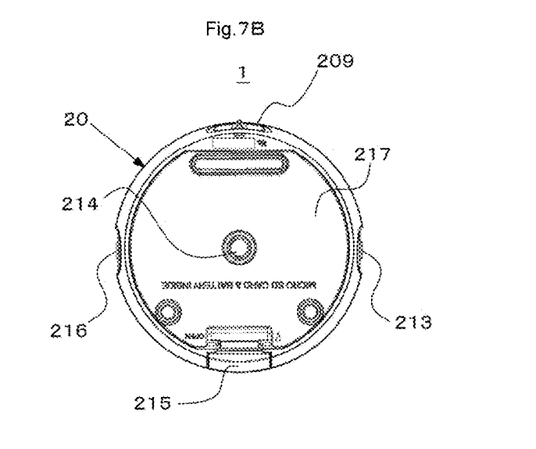
FIG. 7B is a bottom view of the recorder.

A recorder 1 in the present embodiment has an appearance illustrated in the six drawings of FIGS. 6A through 7B. The recorder 1 has a defined front (FIG. 6A), a defined rear (FIG. 6B), a defined left side (FIG. 6C), a defined right side (FIG. 6D), a defined top (FIG. 7A), and a defined bottom (FIG. 7B).

The recorder 1 includes a microphone 10 and a body 20. The microphone 10 is identical to that in FIG. 1A and configured with first through fourth microphone elements 11 to 14. The respective first through fourth microphone elements 11 to 14 are fixed to an upper portion of the body 20 to be directed to FLU, FRD, BRU, and BLD illustrated in FIG. 1B with reference to the front and rear, the left and right, and the top and bottom of the recorder 1. The first through fourth microphone elements 11 to 14 are protected from collision by a metal protector 15.

As illustrated in FIG. 6A, the body 20 has the front provided with a REC LED 201A and a REMOTE terminal 215. The REC LED 201A is turned on while the recorder 1 is recording and slowly blinks while recording is paused. The REC LED 201A rapidly blinks while the inputted signal level exceeds a threshold.

The REMOTE terminal 215 is electrically connected to a wireless adapter, not shown, a Bluetooth® adapter, for example. The recorder 1 is allowed to wirelessly communicate via the wireless adapter with a smartphone, a tablet PC, a laptop PC, a desktop PC, and the like, not shown. A user can remotely operate the recorder 1 using such a smartphone and the like. The recorder 1 is capable of outputting audio signals to a headphone 30 illustrated in FIGS. 8 and 9 via the wireless adapter.

As illustrated in FIG. 6B, the body 20 has the rear provided with a REC LED 201B, a display 202, a REC key 203, a STOP/HOME key 204, a REW/Select key 205, a PLAY/PAUSE/ENTER key 206, an FF/Select key 207, a MENU key 208, and a Power/HOLD switch 209.

The REC LED 201B has functions identical to the REC LED 201A illustrated in FIG. 6A. The user is allowed to check the state of recording by the REC LED 201B while operating the recorder 1.

Figure 8:
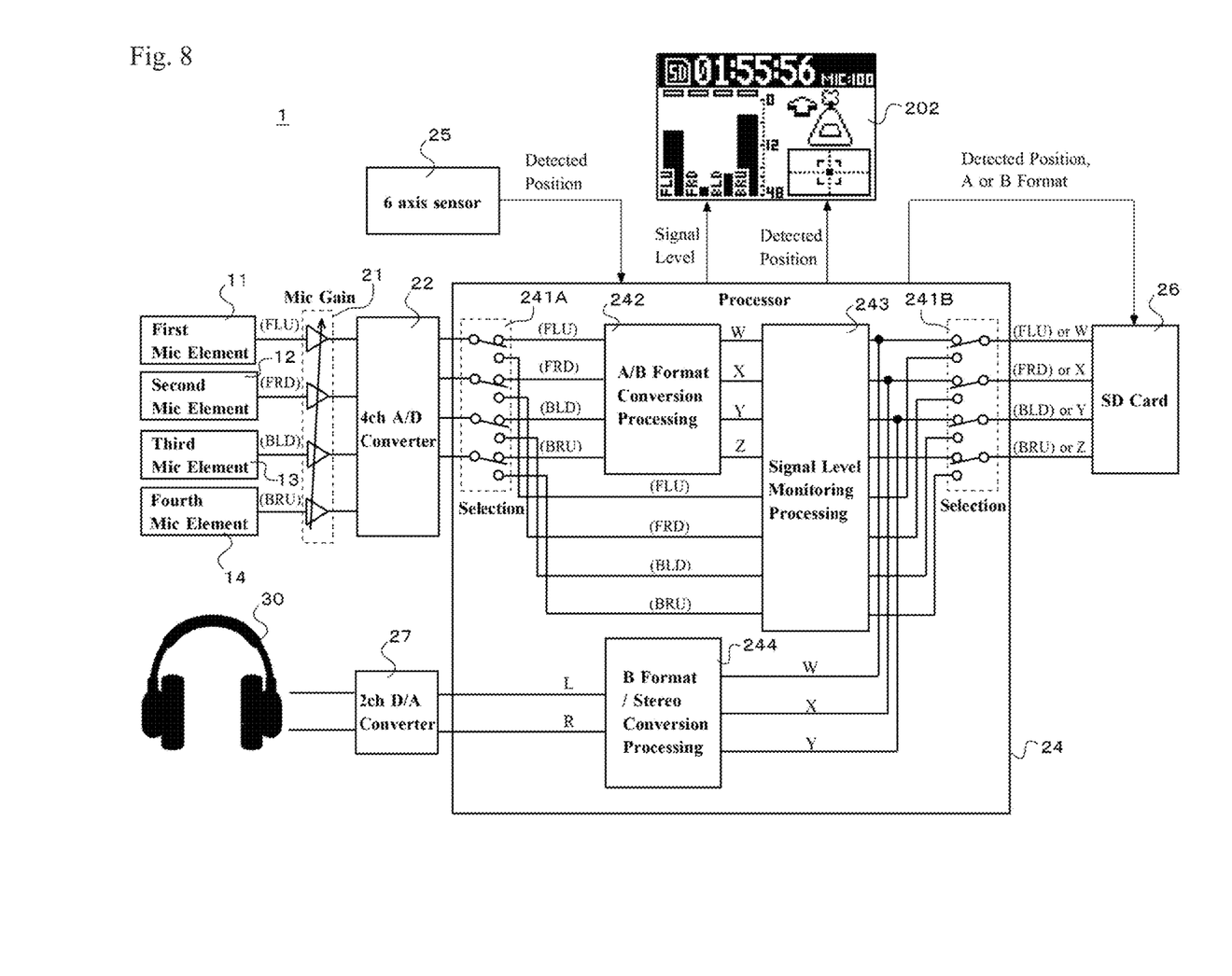
FIG. 8 is a block diagram illustrating configuration for recording by the recorder.
Figure 9:
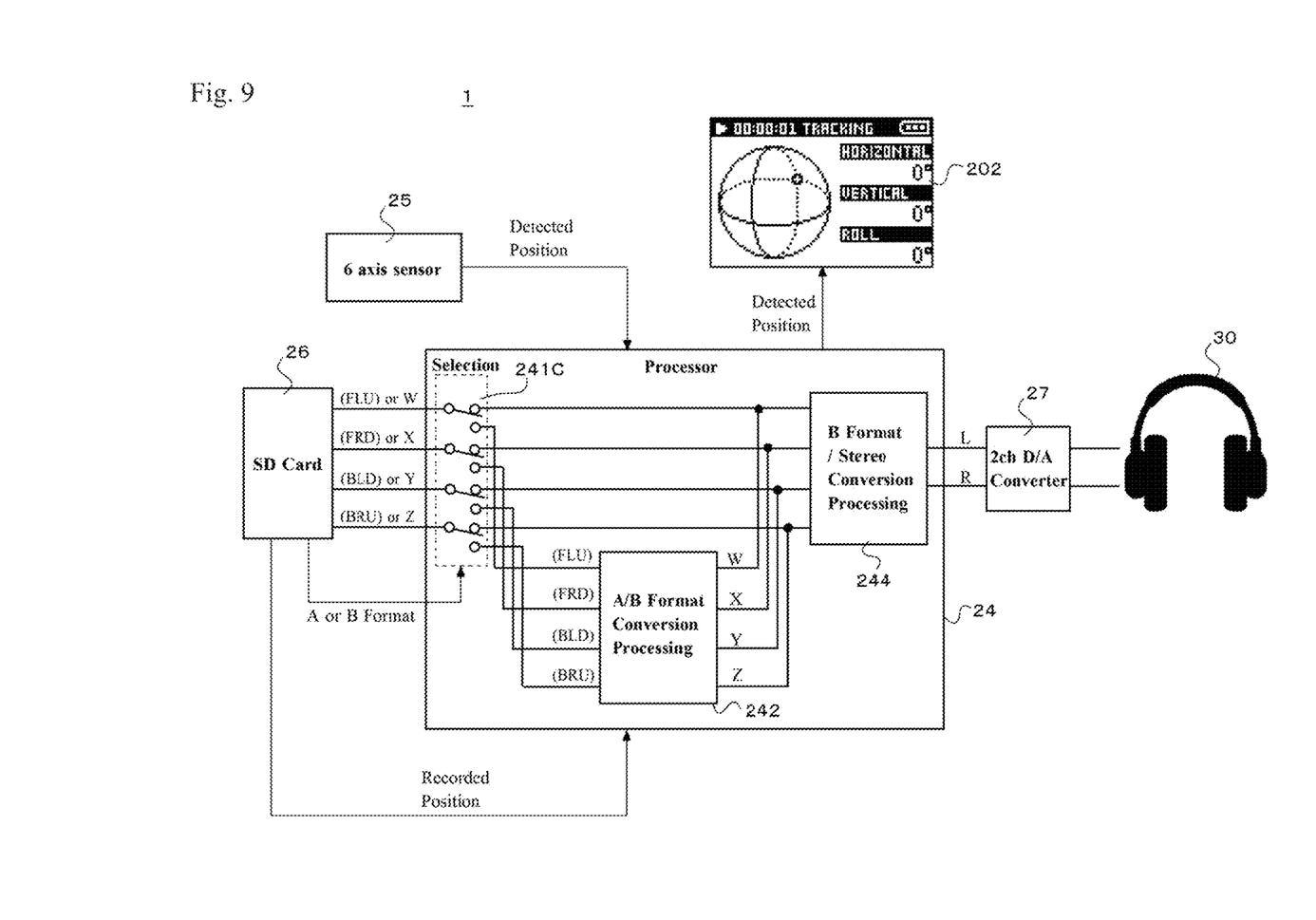
FIG. 9 is a block diagram illustrating configuration for playback by the recorder.

The display 202 displays various types of information on the recorder 1. Specific examples of the information displayed on the display 202 are illustrated in FIGS. 8 and 9. As illustrated in FIG. 8, the display 202 displays information, while the recorder 1 is recording, on the recording time, the signal levels of the A or B format signals, and the degree of horizontality and the degree of verticality of the body 20. As illustrated in FIG. 9, the display 202 displays information on, while the recorder 1 is playing back, the playback time and the degree of horizontality, the degree of verticality, and the rotation of the body 20.

The REC key 203 is operated to start recording. The STOP/HOME key 204 is operated to stop recording or playing back and cause the display 202 to display a home screen. The REW/Select key 205 is operated to rewind the playback position of a file and select an item displayed on the display 202.

The PLAY/PAUSE/ENTER key 206 is operated to start playing back, pause the recording or playing back, and determine the selected item. The FF/Select key 207 is operated to fast forward the playback position of a file and select an item displayed on the display 202. The MENU key 208 is operated to cause the display 202 to display a MENU screen. The Power/HOLD switch 209 is operated to turn on/off the power supply of the recorder 1 and deactivate key operations.

As illustrated in FIG. 6C, the body 20 has the left side provided with a MIC GAIN dial 211, a USB terminal 212, and a LINE OUT terminal 213. The MIC GAIN dial 211 is operated to control the degree of amplification of the sound inputted from the first through fourth microphone elements 11 to 14. When the MIC GAIN dial 211 is operated, the degree of amplification of a microphone gain (amplifier) 21 illustrated in FIG. 8 is varied.

The USB terminal 212 is used to electrically connect the recorder 1 to another device. For example, the recorder 1 is electrically connected to a personal computer (PC), not shown, via the USB terminal 212 to be used as an audio interface or a card reader. The USB terminal 212 is connected to an AC adapter, not shown, to supply the power to the recorder 1. The LINE OUT terminal 213 is used to output audio signals to another device.

As illustrated in FIG. 6D, the body 20 has the right side provided with a VOLUME key 210 and a PHONE OUT terminal 216. The VOLUME key 210 is operated to control the volume of the sound outputted from the recorder 1. The PHONE OUT terminal 216 is used to connect the headphone 30 illustrated in FIGS. 8 and 9 by wire.

As illustrated in FIG. 7B, the body 20 has the bottom to which a bottom cover 217 is detachably mounted. The bottom cover 217 is detached to replace an SD card 26 (refer to FIGS. 8 and 9) stored in the body 20 and a battery, not shown. The bottom cover 217 is also provided with a threaded hole 214 at the center. The recorder 1 is allowed to be mounted to a tripod, not shown, via the threaded hole 214.

<Internal Structure>

Then, with reference to FIGS. 8 and 9, the internal structure of the recorder 1 according to the present embodiment is described. The recorder 1 is provided with a recording function and a playback function for ambisonics. FIG. 8 is a block diagram illustrating the configuration for recording by the recorder 1. FIG. 9 is a block diagram illustrating the configuration for playback by the recorder 1.

<<Configuration for Recording>>

As illustrated in FIG. 8, the recorder 1 is provided with the first through fourth microphone elements 11 to 14, the microphone gain 21, an A/D converter 22, a processor 24, a six-axis sensor 25, the display 202, the SD card 26, and a D/A converter 27.

The respective first through fourth microphone elements 11 to 14 pick up sound from four different directions and output first signals. The four first signals outputted from the first through fourth microphone elements 11 to 14 are collectively called as four-channel A format signals. In this situation, the orientation of the first through fourth microphone elements 11 to 14 varies depending on the placement of the recorder 1 and thus does not necessarily coincide with FLU, FRD, BLD, and BRU illustrated in FIG. 1B. Accordingly, in FIG. 8, the four first signals outputted from the first through fourth microphone elements 11 to 14 are indicated in parentheses as "(FLU)", "(FRD)", "(BRU)", and "(BLD)". The indications of "(FLU)", "(FRD)", "(BRU)", and "(BLD)" in FIG. 8 are given to draw a distinction between the respective first signals and do not mean that the sound as the sources of the respective first signals are picked up from the respective directions of actual FLU, FRD, BLD, and BRU. The sound as the sources of the respective first signals may be picked up from any direction other than FLU, FRD, BLD, and BRU in accordance with the placement of the recorder 1.

The four-channel A format signals outputted from the first through fourth microphone elements 11 to 14 is inputted to the microphone gain 21. The microphone gain 21 amplifies the four-channel A format signals at a degree of amplification set by the MIC GAIN dial 211 illustrated in FIG. 6C.

The four-channel A format signals amplified by the microphone gain 21 are inputted to the A/D converter 22. The A/D converter 22 converts the A format signals as analog signals to digital signals. The A format signals converted to a digital signals are inputted to the processor 24.

The processor 24 executes recording format selection processing 241A, A/B format conversion processing 242, signal level monitoring processing 243, B format/stereo conversion processing 244, and recording format selection processing 241B. The processor 24 executes the recording format selection processing 241A when the four-channel A format signals are inputted. In the recording format selection processing 241A, the processor 24 selects which data format of A format or B format to record the inputted A format signals based on the recording format specified by a user. When the B format is selected, the processor 24 executes the A/B format conversion processing 242. The processing 242, 243, 244, and 241B other than the recording format selection processing 241A are described later.

The processor 24 is electrically connected respectively to the six-axis sensor 25, the display 202, the SD card 26, and the D/A converter 27. The six-axis sensor 25 is configured with an accelerometer and a gyro sensor. The accelerometer detects displacement of the body 20 of the recorder 1 in forward and backward directions, left and right directions, and upward and downward directions and outputs angular information of the body 20 in a horizontal direction and a vertical direction. Meanwhile, the gyro sensor detects rotation of the body 20 and outputs angular information in a rotation direction. The angular information in the horizontal direction, the vertical direction, and the rotation direction outputted from the six-axis sensor 25 is collectively called as positional information. The positional information outputted from the six-axis sensor 25 is inputted to the processor 24 and used for the A/B format conversion processing 242.

<<A/B Format Conversion Processing>>

The processor 24 executes the A/B format conversion processing 242 when the inputted four-channel A format signals are recorded in the B format. In the A/B format conversion processing 242, the processor 24 distinguishes the respective sound pickup directions of the first through fourth microphone elements 11 to 14 based on the positional information of the body 20 detected by the six-axis sensor 25. The processor 24 then selects mathematical expressions to convert the four-channel A format signals to four-channel B format signals based on the respective sound pickup directions of the first through fourth microphone elements 11 to 14. The processor 24 then adds and subtracts the four first signals outputted from the respective first through fourth microphone elements 11 to 14 based on the selected mathematical expressions and converts them to four second signals W, X, Y, and Z to be components of the B format signals.

For example, the processor 24 is capable of distinguishing the placement of the recorder 1 as any of "Upright", "Endfire", and "Upside Down" illustrated in FIGS. 5A through 5C based on the positional information of the body 20 detected by the six-axis sensor 25. The processor 24 is also capable of distinguishing the respective sound pickup directions of the first through fourth microphone elements 11 to 14 based on the placement of the recorder 1.

In FIG. 5A, when the placement of the recorder 1 is distinguished as "Upright", the processor 24 distinguishes that the respective sound pickup directions of the first through fourth microphone elements 11 to 14 as FLU, FRD, BLD, and BRU. In this case, the processor 24 selects the above formulae (1) through (4). The processor 24 then adds and subtracts the four first signals FLU, FRD, BLD, and BRU outputted from the first through fourth microphone elements 11 to 14 based on the above formulae (1) through (4) and converts them to the four second signals W, X, Y, and Z to be the components of the B format signals.

In FIG. 5B, when the placement of the recorder 1 is distinguished as "Endfire", the processor 24 distinguishes the respective sound pickup directions of the first through fourth microphone elements 11 to 14 as FLD, BRD, BLU, and FRU. In this case, the processor 24 selects the above formulae (5) through (8). The processor 24 then adds and subtracts the four first signals FLD, BRD, BLU, and FRU outputted from the first through fourth microphone elements 11 to 14 based on the above formulae (5) through (8) and converts them to the four second signals W, X, Y, and Z to be the components of the B format signals.

In FIG. 5C, when the placement of the recorder 1 is distinguished as "Upside Down", the processor 24 distinguishes the respective sound pickup directions of the first through fourth microphone elements 11 to 14 as FRD, FLU, BRU, and BLD. In this case, the processor 24 selects the above formulae (1) through (4). The processor 24 then adds and subtracts the four first signals FRD, FLU, BRU, and BLD outputted from the first through fourth microphone elements 11 to 14 based on the above formulae (1) through (4) and converts them to the four second signals W, X, Y, and Z to be the components of the B format signals.

As just described, in the A/B format conversion processing 242, the processor 24 distinguishes the placement of the recorder 1 and the respective orientation of the first through fourth microphone elements 11 to 14 based on the positional information of the body 20 and executes arithmetic processing to calculate W, X, Y, and Z as the B format signals in a correct positional relationship. Such A/B format conversion processing 242 allows conversion of the sound picked up by the first through fourth microphone elements 11 to 14 to W, X, Y, and Z as the B format signals in a correct positional relationship no matter in which orientation the recorder 1 is placed among "Upright", "Endfire", and "Upside Down" illustrated in FIG. 4. In other words, no matter in which orientation the recorder 1 is placed, W, X, Y, and Z for as B format signals converted by the A/B format conversion processing 242 correctly reproduces the sound field during recording.

Moreover, the processor 24 causes the display 202 to display a level image based on the positional information of the body 20. The level displayed on the display 202 includes two images. One of them is an image schematically indicating the appearance of the recorder 1. The image of the recorder 1 is tilted in the vertical direction based on the positional information of the body 20 to visually indicate the degree of verticality of the body 20. The other one is an image of two axes intersecting each other. The image of the two axes is tilted in the horizontal direction and the vertical direction based on the positional information of the body 20 to visually indicate the degree of horizontality and the degree of verticality of the body 20. A user can accurately place the recorder 1 horizontally and vertically by referring to the level image displayed on the display 202.

<<Signal Level Monitoring Processing>>

The processor 24 executes the signal level monitoring processing 243 on W, X, Y, and Z as the B format signals converted by the A/B format conversion processing 242. Meanwhile, when the four-channel A format signals inputted from the A/D converter 22 is directly recorded, the processor 24 executes the signal level monitoring processing 243 on the A format signals.

In the signal level monitoring processing 243, the processor 24 detects respective levels of the four-channel signals (first or second signals) as the components of the A or B format signals and causes the display 202 to display the respective detected four signal levels. For example, the display 202 displays indicator images indicating the respective signal levels of FLU, FRD, BRU, and BLD. A user is capable of monitoring whether or not the recording is performed at the optimum signal level by referring to the indicator images.

<<Data Recording>>

After executing the signal level monitoring processing 243, the processor 24 executes the recording format selection processing 241B to record the data of the A format signals or W, X, Y, and Z as the B format signals in the SD card 26.

In this situation, the processor 24 outputs the positional information of the body 20 detected by the six-axis sensor 25 to the SD card 26 to record them in the SD card 26 as metadata for the data of the A format signals or W, X, Y, and Z as the B format signals. The recorded positional information of the body 20 identifies the placement of the recorder 1 during recording and plays a particularly important role when the data of the A format signals are recorded.

That is, the data of the A format signals recorded in the SD card 26 is allowed to be played back by the recorder 1 or a general purpose computer with a program installed therein to execute the A/B format conversion processing 242 described above. For execution of the A/B format conversion processing 242, the processor 24 of the recorder 1 or a processor of the general purpose computer refers to the positional information of the body 20 recorded in the SD card 26, thereby converting the data of the A format signals to W, X, Y, and Z as the B format signals in a correct positional relationship for playback.

In addition, the processor 24 outputs information on a recording format type to the SD card 26 to be recorded in the SD card 26 as metadata for the data of the A format signals or W, X, Y, and Z as the B format signals. The information on the recording format type is referred to for playback of the data of the A format signals or W, X, Y, and Z as the B format signals recorded in the SD card 26.

<<B Format/Stereo Conversion Processing>>

When the B format is selected as the recording format, the recorder 1 converts W, X, and Y in the four-channel B format signals to L and R of two-channel stereo signals, thereby allowing real time monitoring of the state of recoding.

After executing the A/B format conversion processing 242 and the signal level monitoring processing 243, the processor 24 executes the B format/stereo conversion processing 244. In the B format/stereo conversion processing 244, the processor 24 adds and subtracts W, X, and Y in the four-channel B format signals based on formulae (9) and (10) below and converts them to two third signals L and R to be components of the two-channel stereo signals.

$$L = W + X + Y \quad (9)$$

$$R = W + X - Y \quad (10)$$

In the above formulae, L denotes a left audio signal, R denotes a right audio signal, W denotes a signal of sound in all directions, X denotes a signal of sound in forward and backward directions, and Y denotes a signal of sound in left and right directions.

L and R of the two-channel stereo signals converted by the B format/stereo conversion processing 244 are inputted to the D/A converter 27. The D/A converter 27 converts L and R of the stereo signals as digital signals to respective analog signals. L and R of the stereo signals converted to the analog signals are outputted from left and right speakers of the headphone 30. A user is capable of real time monitoring of the state of recoding by the recorder 1 by listening to stereo audio outputted from the headphone 30.

In the B format/stereo conversion processing 244, the mathematical expressions to convert the B format signals to L and R of the stereo signals are not limited to the above formulae (9) and (10). At the time of filing this application, various mathematical expressions to convert the B format signals to L and R of the stereo signals are known by those skilled in the art. In the B format/stereo conversion processing 244, the B format signals may be converted to L and R of the stereo signals using mathematical expressions other than the above formulae (9) and (10).

<<Configuration for Playback>>

Then, with reference to FIG. 9, configuration for playback of the data of the A format signals or W, X, Y, and Z as the B format signals recorded in the SD card 26 is described.

For playback of the data recorded in the SD card 26, the processor 24 executes recording format selection processing 241C. In the recording format selection processing 241C, the processor 24 refers to the information on the recording format type recorded as the metadata. The processor 24 distinguishes the data recorded in the SD card 26 as the A or B format signals based on the information on the recording format type.

<<A/B Format Conversion Processing>>

When the data recorded in the SD card 26 is the A format signals, the processor 24 executes A/B format conversion processing 242 similar to the case of "recording" illustrated in FIG. 8. It should be noted that, in the A/B format conversion processing 242 for "playback" illustrated in FIG. 9, the positional information of the body 20 recorded in the SD card 26 as the metadata is referred to. This is the difference from the A/B format conversion processing 242 for "recording" illustrated in FIG. 8.

That is, in the A/B format conversion processing 242 for "playback" illustrated in FIG. 9, the processor 24 distinguishes the placement of the recorder 1 and the respective orientation of the first through fourth microphone elements 11 to 14 based on the positional information of the body 20 during recording and executes arithmetic processing to calculate W, X, Y, and Z as the B format signals in a correct positional relationship. The A/B format conversion processing 242 illustrated in FIG. 9 allows conversion of the data of the A format signals recorded in the SD card 26 to W, X, Y, and Z as the B format signals in a correct positional relationship considering the placement of the recorder 1 during recording. Such W, X, Y, and Z as the B format signals correctly reproduce the sound field during recording.

<<B Format/Stereo Conversion Processing>>

When the data recorded in the SD card 26 is W, X, Y, and Z as the B format signals, the processor 24 executes B format/stereo conversion processing 244. The processor 24 also executes the B format/stereo conversion processing 244 on W, X, Y, and Z as the B format signals converted from the A format signals by the A/B format conversion processing 242 described above.

In the B format/stereo conversion processing 244, the processor 24 adds and subtracts W, X, and Y in the four-channel B format signals based on the above formulae (9) and (10) and converts them to the two third signals L and R to be the components of the two-channel stereo signals.

In this situation, the B format/stereo conversion processing 244 for "playback" illustrated in FIG. 9 is different from the B format/stereo conversion processing 244 for "monitoring" of the state of recoding illustrated in FIG. 8. That is, the B format/stereo conversion processing 244 illustrated in FIG. 9 is executed real time while the data is playing back. The positional information of the body 20 detected by the six-axis sensor 25 is also updated real time while the data is playing back. Accordingly, L and R of the stereo signals converted by the B format/stereo conversion processing 244 vary the directivity in any direction among the omnidirectionality including the forward and backward (X), the left and right (Y), and the upward and downward (Z) directions with displacement of the body 20.

L and R of the two-channel stereo signals converted by the B format/stereo conversion processing 244 are inputted to the D/A converter 27. The D/A converter 27 converts L and R of the stereo signals as digital signals to respective analog signals. L and R of the stereo signals converted to the analog signals are outputted from the left and right speakers of the headphone 30. A user is allowed to freely change the localization of the stereo audio outputted from the headphone 30 by the displacement of the body 20.

<Application of Playback Software>

The playback software causing the processor to execute the A/B format conversion processing 242 and the B format/stereo conversion processing 244 illustrated in FIG. 9 is applicable to a general purpose computer.

The playback software is, for example, stored in a server connected to an internet line and provided to a general purpose computer via the internet line. The installation of the playback software allows the general purpose computer to play back the data of the A format signals or W, X, Y, and Z for the B format signals recorded by the recorder 1 in the present embodiment.

In particular, the general purpose computer to have the playback software installed therein is preferably a mobile device provided with a six-axis sensor, such as a smartphone, a tablet PC, a portable music player, and a mobile video game machine. A user is allowed to freely change the localization of the played-back stereo audio by displacing the mobile device to casually enjoy ambisonics.

DESCRIPTION OF REFERENCE NUMERALS

1 Recorder
10 Microphone
11 First Microphone Element
12 Second Microphone Element
13 Third Microphone Element
14 Fourth Microphone Element
15 Protector
20 Body
201A, 201B REC LED
202 Display (Image Display)
203 REC Key
204 STOP/HOME Key
205 REW/Select Key
206 PLAY/PAUSE/ENTER Key
207 FF/Select Key
208 MENU Key
209 Power/HOLD Switch
210 VOLUME Key
211 MIC GAIN Dial
212 USB Terminal
213 LINE OUT Terminal
214 Threaded Hole
215 REMOTE Terminal
216 PHONE OUT Terminal
217 Bottom Cover
21 Microphone Gain
22 A/D Converter
23A, 23B, 23C Selection Switch
24 Processor
241A to 241C Recording Format Selection Processing
242 A/B Format Conversion Processing
243 Signal Level Monitoring Processing
244 B Format/Stereo Conversion Processing
25 Six-Axis Sensor
26 SD Card (Memory)
27 D/A Converter
30 Headphone

The invention claimed is:

1. A microphone to generate A format signals used for ambisonics, comprising:
   a body of the microphone;
   first through fourth microphone elements provided facing sound pickup directions different from each other in the body and configured to output respective first signals to be components of the A format signals, and
   one or more sensors configured to detect displacement of the body and to output information on a position of the body.

2. The microphone of claim 1, wherein the sensor is an accelerometer that is capable of detecting the displacement of the body in forward and backward directions, left and right directions, and upward and downward directions and configured to output angular information in a horizontal direction and a vertical direction of the body.

3. The microphone of claim 2, wherein the sensor further includes a gyro sensor capable of detecting rotation of the body and is configured to output angular information in a rotation direction.

4. A non-transitory computer readable medium storing A/B format conversion software to convert the A format signals generated by the microphone of claim 1 to B format signals, wherein the A/B format conversion software causes a processor to execute the steps of:
   distinguishing respective sound pickup directions of the first through fourth microphone elements based on the information on the position of the body outputted from the sensor;
   selecting mathematical expressions to convert the A format signals to the B format signals based on the respective sound pickup directions of the first through fourth microphone elements; and
   converting the first signals outputted from the respective first through fourth microphone elements, by addition and subtraction based on the mathematical expressions, to a plurality of second signals to be components of the B format signals.

5. A recorder to record data of A format signals and/or B format signals used for ambisonics, the recorder comprising:
   (a) a microphone comprising:
      a body of the microphone;
      first through fourth microphone elements provided facing sound pickup directions different from each other in the body and configured to output respective first signals to be components of the A format signals, and
      one or more sensors configured to detect displacement of the body and to output information on a position of the body;
   (b) a non-transitory computer readable medium storing A/B format conversion software which causes a processor to execute the steps of:
      distinguishing respective sound pickup directions of the first through fourth microphone elements based on the information on the position of the body outputted from the sensor;
      selecting mathematical expressions to convert the A format signals to the B format signals based on the respective sound pickup directions of the first through fourth microphone elements; and
      converting the first signals outputted from the respective first through fourth microphone elements, by addition and subtraction based on the mathematical expressions, to a plurality of second signals to be components of the B format signals;
   (c) the processor to execute the processing of the A/B format conversion software; and
   (d) a memory to record the data of the A format signals and/or the B format signals, wherein
   the information on the position of the body outputted from the sensor is recorded in the memory as metadata for the data of the A format signals and/or the B format signals.

6. The recorder of claim 5, wherein type information of A format or B format is recorded in the memory as metadata for the data of the A format signals or the B format signals.

7. The recorder of claim 5, further comprising an image display, wherein
   the processor causes the image display to display an image indicating a degree of horizontality and/or a degree of verticality of the body based on the information on the position of the body outputted from the sensor.

8. The recorder of claim 5, wherein the non-transitory computer readable medium further storing B format/stereo conversion software to convert the B format signals to stereo signals, wherein
   the B format/stereo conversion software causes the processor to execute the steps of:

differentiating signal levels of two or more of the second signals to be the components of the B format signals from each other based on the information on the position of the body outputted from the sensor, and converting the two or more of the second signals having the differentiated signal levels, by synthesizing them, to two third signals to be components of the stereo signals.

9. A non-transitory computer readable medium storing playback software to play back the data of the B format signals, by a mobile device, recorded by the recorder of claim 5, the playback software comprising B format/stereo conversion software to convert the B format signals to stereo signals, wherein the B format/stereo conversion software causes a processor of the mobile device to execute the steps of:

differentiating signal levels of two or more of the second signals to be the components of the B format signals from each other based on information on a position of a body of the mobile device outputted from a sensor of the mobile device, and converting the two or more of the second signals having the differentiated signal levels, by synthesizing them, to two third signals to be components of the stereo signals.

10. A non-transitory computer readable medium storing playback software to play back the data of the A format signals, by a mobile device, recorded by the recorder of claim 5, the playback software comprising:

the A/B format conversion software to convert the A format signals to the B format signals and B format/stereo conversion software to convert the B format signals to stereo signals, wherein the A/B format conversion software causes a processor of the mobile device to execute the step of:

distinguishing respective sound pickup directions of the first through fourth microphone elements based on the information on the position recorded in the memory as the metadata, and the B format/stereo conversion software causes the processor of the mobile device to execute the steps of:

differentiating signal levels of two or more of the second signals to be the components of the B format signals from each other based on information on a position of a body of the mobile device outputted from a sensor of the mobile device; and converting the two or more of the second signals having the differentiated signal levels, by synthesizing them, to two third signals to be components of the stereo signals.

\* \* \* \* \*